(12) United States Patent
Vikberg et al.

(10) Patent No.: US 6,925,074 B1
(45) Date of Patent: Aug. 2, 2005

(54) MOBILE COMMUNICATION NETWORK

(75) Inventors: Jari T. Vikberg, Södertälje (SE); Jan A. Gjärdman, Farsta (SE); Magnus Hallenstål, Täby (SE); Ros-Marie Furtenback, Joanneshov (SE); Tomas Nylander, Stavsnäs (SE); Martin Hänström, Norsborg (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 924 days.

(21) Appl. No.: 09/717,121

(22) Filed: Nov. 22, 2000

(51) Int. Cl.[7] .............................. H04Q 7/24; H04Q 7/00
(52) U.S. Cl. .................................. 370/338; 370/329
(58) Field of Search ................................ 370/328, 329, 370/338, 349, 352, 401, 465, 466, 469

(56) References Cited

U.S. PATENT DOCUMENTS

| | | | |
|---|---|---|---|
| 6,246,376 B1 * | 6/2001 | Bork et al. | 343/760 |
| 6,246,670 B1 * | 6/2001 | Karlsson et al. | 370/244 |
| 6,297,737 B1 * | 10/2001 | Irvin | 340/571 |
| 6,405,027 B1 * | 6/2002 | Bell | 455/403 |
| 6,445,921 B1 * | 9/2002 | Bell | 455/426.1 |
| 6,584,146 B2 * | 6/2003 | Bose et al. | 375/219 |
| 6,618,592 B1 * | 9/2003 | Vilander et al. | 455/452.1 |
| 6,650,871 B1 * | 11/2003 | Cannon et al. | 455/41.2 |
| 6,714,797 B1 * | 3/2004 | Rautila | 455/552.1 |

FOREIGN PATENT DOCUMENTS

| | | |
|---|---|---|
| EP | 0766427 A | 4/1997 |
| EP | 0851700 A | 7/1998 |
| WO | WO99/35800 | 7/1999 |
| WO | WO99/48315 | 9/1999 |
| WO | WO99/56486 | 11/1999 |

* cited by examiner

*Primary Examiner*—Chau Nguyen
*Assistant Examiner*—Andrew Wahba

(57) ABSTRACT

A mobile telecommunications network is proposed with an access network portion (10) having several base station systems (101) that can communicate with a core network portion (20). The base station systems are adapted to communicate with mobile terminals (1) over a licensed public mobile network air interface and with the core network portion over a predetermined network interface. The network also includes at least one local base station system (104, 105, 106) that is arranged to communicate with the core network portion over the predetermined network interface. This local base station system is further adapted to communicate with mobile terminals over an unlicensed radio interface (11). The local base station system makes use of an existing fixed network based on IP.

9 Claims, 7 Drawing Sheets

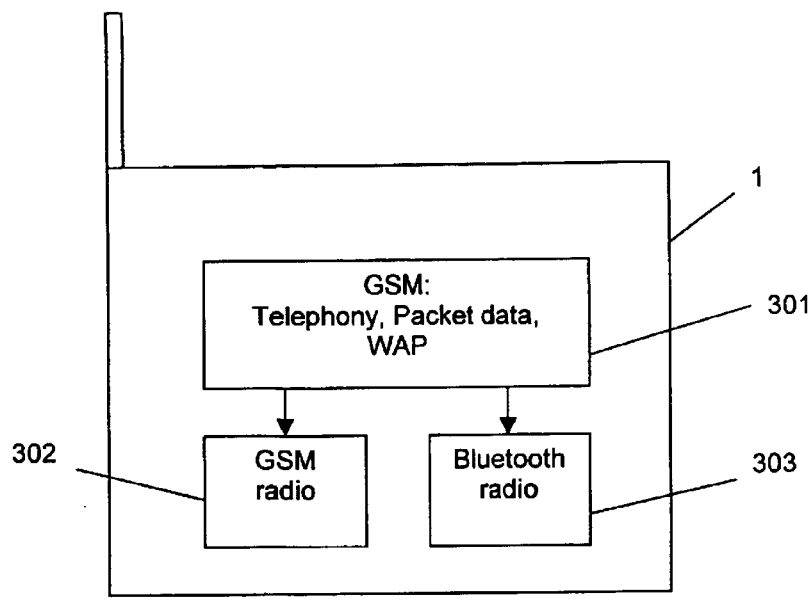
Fig. 3
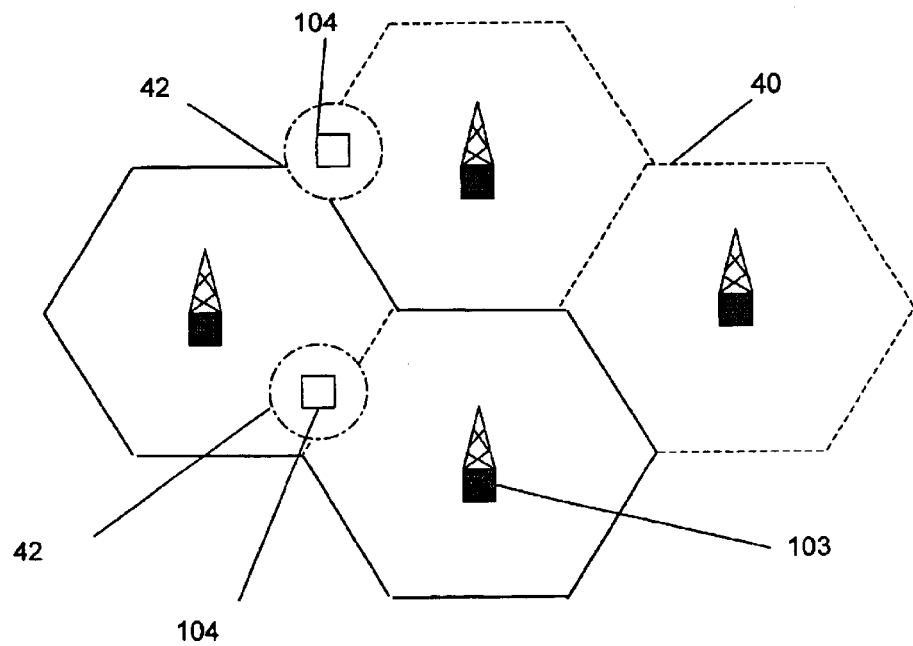
Fig. 7
Fig. 6

MOBILE COMMUNICATION NETWORK

FIELD OF INVENTION

The invention concerns mobile communication networks, with specific relevance to mobile telephone networks and the transition between fixed and mobile telephony services.

BACKGROUND ART

Mobile communication is becoming increasingly widespread as the number of available services multiply. However the higher billing costs associated with most mobile networks and also the often inferior reception of mobile signals inside some buildings mean that subscribers generally prefer to retain a fixed telephone access in the home or a place of business. The types of services and also the way in which these services are presented differ depending on whether the subscriber is using a mobile phone or a fixed phone. This can range from the provision of completely different services, such as SMS, to the manner in which an address book is used. Moreover, subscribers to mobile and fixed phone networks will generally have different subscriptions and thus different phone numbers. Indeed in many countries, a reliable fixed access to telecommunication services is provided by only a single operator. A subscriber to both a mobile and fixed telephone network will therefore be obliged to adapt the manner in which he uses the fixed and mobile sets.

A presently available service uses a single handset that combines a GSM terminal with a cordless handset for accessing a fixed network. The handset can access the fixed network, for example via a PBX in a corporate facility, using a digital enhanced cordless telecommunications (DECT) system. When the handset passes out of range of the PBX base station the handset communicates with the GSM network. The user has both a fixed and a mobile subscription and also has separate numbers associated with these subscriptions. This allows the user to retain the use of a single phone, however, the services available will depend on whether the phone is being used as a GSM terminal or cordless handset. The phone is also large compared to conventional mobile terminals since it essentially consists of a GSM terminal arranged back to back with a DECT handset.

It is thus an object of the present invention to provide an improved communication network that alleviates the problems of prior art arrangements.

It is a further object of the present invention to provide a communication network and network elements that enable a uniformity of service whether a subscriber uses a fixed or mobile access to telecommunication services.

SUMMARY OF INVENTION

These and further objects are attained in a mobile telecommunications network having an access network portion and a core network portion. The access network portion includes an access control part that is arranged to communicate with the core network portion over a predetermined licensed mobile network interface, such as an A interface for GSM or Iu interface for UMTS. The access network portion also includes one or more base station parts that are arranged to communicate with mobile terminals over an unlicensed radio interface and also a fixed broadband network connecting the access control part and the base station parts. The access network portion is furthermore arranged to relay upper layer messages between a mobile terminal and said core network portion in a transparent manner over the unlicensed radio interface and fixed network.

By providing access to the public mobile network service through an unlicensed radio interface, that by definition will be low power and have a small range compared to conventional access networks such as the base station subsystems BSS in GSM or URAN in UMTS, and by relaying upper layer messages in a transparent manner, i.e. without mapping or similar interworking, the same service and subscription can be retained by the subscriber without perceiving a difference in the level and presentation of service obtainable. Moreover, the voice quality in the home or office environment is greatly improved by the local coverage. The battery lifetime of his mobile terminals will also be greater than when it is used uniquely with conventional access networks. In addition, a public mobile network operator would be able to offer a fixed access service without the need for additional cell planning.

Advantageously, the connection between the base station part and the access controller part exploits an already existing broadband fixed network available to the subscriber at his home or workplace. This network may be a cable TV network, or ADSL network, but is preferably IP based so that the interface between the access network elements is independent of the physical network type. In an alternative embodiment the fixed network may be an ATM-based network. In particular, DSL type networks could run over ATM directly. Other technologies could be run on an ATM-based network on top of IP.

Preferably the unlicensed radio is of high bandwidth, which will further improve voice quality and permit other devices to be connected to the public mobile network. This enables the use of various data communication applications in the mobile terminal, such as WAP. Most preferably the unlicensed radio interface uses the Bluetooth standard, which lends itself readily to the transparent transport of upper layer messages between a mobile terminal and access network portion.

The invention further resides in a base station for use as part of an access network arranged to communicate with a core network portion of a public mobile telecommunications network. The base station is adapted to communicate over an unlicensed radio interface with at least one mobile terminal. It is also arranged to communicate with an access control part of the access network through a fixed broadband network, that is preferably available at a subscribers home or workplace. The access control part is connected to the core network, and the base station is arranged to relay messages transmitted between said mobile terminal and said core network transparently over the unlicensed radio interface and through said fixed network.

In accordance with a further aspect, the invention resides in an access network controller for use as part of an access network arranged to enable communication of a mobile terminal with a public mobile telecommunications network through an unlicensed radio interface. The access network controller is arranged to communicate with a core network portion of the public mobile telecommunications network over a predetermined licensed mobile network interface, such as an A interface of GSM or Iu interface of UMTS. It is further connected to a fixed broadband network for communication with mobile terminals through one or more base stations. The access network controller is arranged to transmit and receive upper layer messages exchanged with mobile terminals in a transparent manner over said fixed broadband network.

The invention also resides in a mobile terminal for communicating with a mobile telecommunications network that includes an access network portion and a core network portion. The terminal has a communication management module for generating upper layer messages for, and receiving upper layer messages from, the core network (20). Upper layer messages essentially correspond to layer 3 messages and above. The mobile terminal also has a first interface module for establishing a licensed public mobile network radio link with the access network portion and relaying the upper layer messages to and from said communication management module. Such a link would typically use the GSM Um interface. The terminal further includes a second interface module for establishing an unlicensed radio link with a modified access network connected to the core network. The second interface module is arranged to relay said upper layer messages over the unlicensed radio link when the mobile terminal is connected to the modified access network.

The invention also relates to a method of connecting a base station with an access control part of an access network over a fixed broadband network, and a method of registering a base station with an access control part.

BRIEF DESCRIPTION OF THE DRAWINGS

Further objects and advantages of the present invention will become apparent from the following description of the preferred embodiments that are given by way of example with reference to the accompanying drawings. In the figures:

FIG. 6 schematically depicts the organisation of cells in accordance with the present invention, FIG. 7 schematically illustrates a subscriber location register of the home base station controller.

DETAILED DESCRIPTION OF THE DRAWINGS

Figure 1:
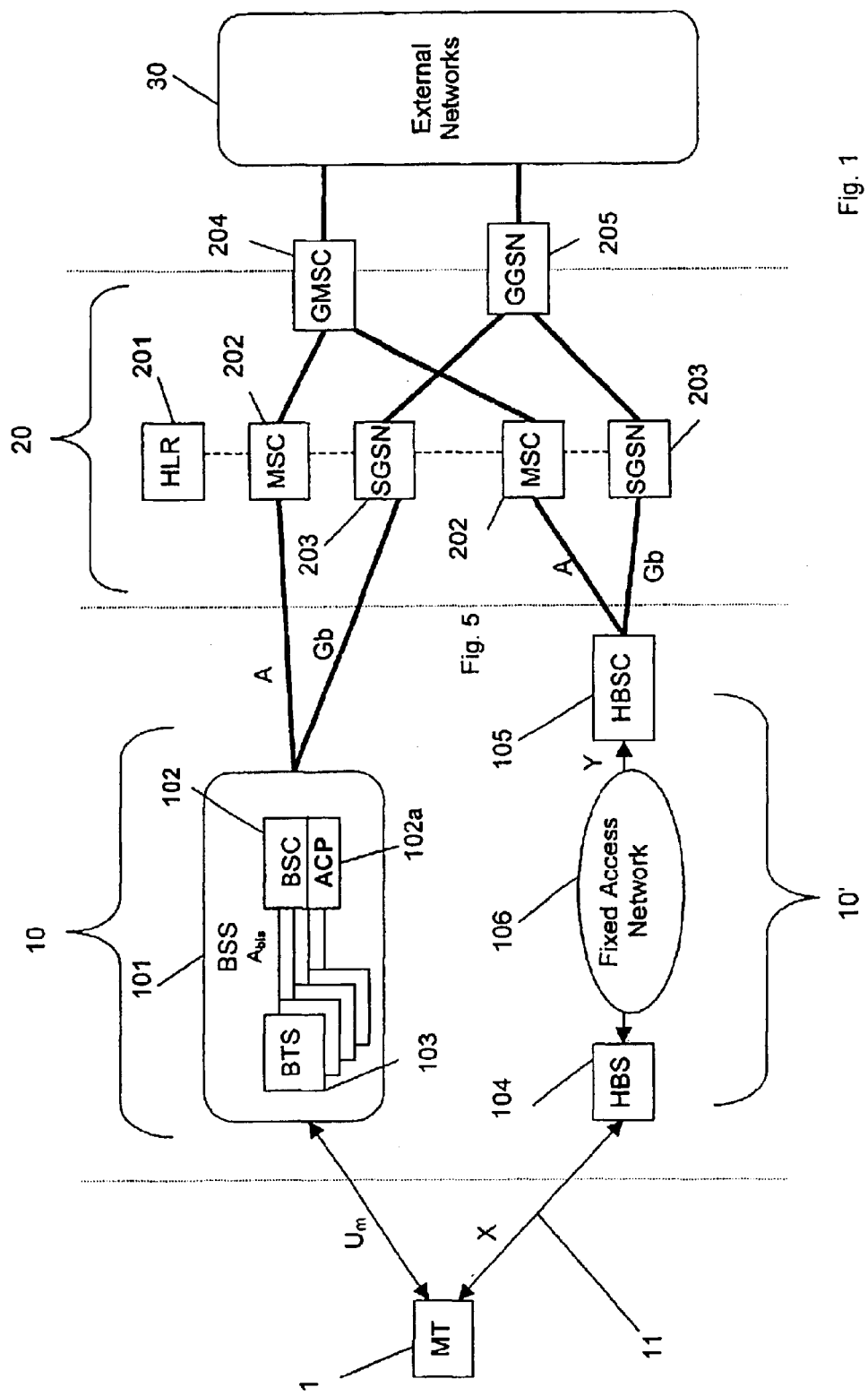
FIG. 1 schematically depicts parts of a GSM network modified in accordance with the present invention.

The network illustrated schematically in FIG. 1 includes standard elements of the GSM architecture and also includes elements of a General Packet Radio Service (GPRS) network. A mobile phone or terminal MT 1 is illustrated in FIG. 1. This communicates with the GSM network. The network comprises a access network portion (AN) 10 and a core network portion (CN) 20. The divisions between these portions are denoted by dotted lines in FIG. 1. As the names suggest, the access network portion 10 provides the mobile terminal 1 with access to the core network 20, and through this to other network services.

In the exemplary network illustrated in FIG. 1 the core network portion 20 includes a home location register (HLR) 201 and mobile services switching centres (MSC) 202. The network also supports the General Packet Radio Service, and to this end includes serving GPRS support nodes (SGSN) 203. The function and structure of these elements are well known and will not be described in detail here. Moreover, it will be understood that other elements will be present in a GSM core network although they are not illustrated in FIG. 1. The core network portion 20 may provide access to other, external networks 30, such as ISDN and PSTN networks and packet and circuit switched packet data networks such as intranets, extranets and the Internet through one or more gateway mobile service switching centres GMSCs 204 and gateway GPRS support nodes GGSNs 205.

The access network portion 10 includes the typical GSM elements, specifically base station subsystems BSS 101, one of which is illustrated schematically in FIG. 1. The base station subsystems 101 are connected through the defined fixed standard A and Gb interfaces with MSCs 202 and SGSNs 203, respectively in the core network portion 20. Each base station substystem 101 includes a base station controller BSC 102 which communicates with one or more base transceiver stations BTS 103 via the defined $A_{bis}$ air interface. The base transceiver stations 103 communicate with mobile terminal MT 1 over the GSM standard $U_m$ radio air interface. It will be understood that while the BTS 103 and BSC 102 are depicted as forming a single entity in the BSS 101, the BSC is often separate from the BTSs and may even be located at the mobile services switching centre MSC 202. The physical division depicted in FIG. 1 serves to distinguish between the parts of the network making up the access network portion 10 and those that form the core network portion 20.

In some embodiments, the BSS 101 also includes a access control part (ACP) 102a arranged to communicate with the core network portion 20 over a licensed mobile network interface.

In addition to the standard GSM access network portion provided by the BSSs 101, the network according to the invention includes a modified access network portion as shown in the lower half of FIG. 1 and denoted by the numeral 10'. Hereinafter this will be described as a fixed access network portion 10'. The components making up this fixed access network portion 10' also enable the mobile terminal 1 to access the GSM core network portion, and through this, other communication networks via an unlicensed radio interface X, represented in FIG. 1 by the bi-directional arrow 11. By unlicensed radio is meant any radio protocol that does not require the operator running the mobile network to have obtained a license from the appropriate regulatory body. In general, such unlicensed radio technologies must be low power and thus of limited range compared to licensed mobile radio services. This means that the battery lifetime of mobile terminals will be greater. Moreover, because the range is low the unlicensed radio may be a broadband radio, thus providing improved voice quality. The radio interface may utilise any suitable unlicensed radio protocol, for example a wireless LAN protocol or Digital Enhanced Cordless Telecommunications (DECT). Preferably, however, Bluetooth radio is utilised, which has a high bandwidth and lower power consumption than conventional public mobile network radio.

The Bluetooth standard specifies a two-way digital radio link for short-range connections between different devices. Devices are equipped with a transceiver that transmits and receives in a frequency band around 2.45GHz. This band is available globally with some variation of bandwidth depending on the country. In addition to data, up to three voice channels are available. Each device has a unique 48-bit address from the IEEE 802 standard. Built-in encryption and verification is also available.

The element of the fixed access network portion 10' adapted to communicate across the Bluetooth interface is designated a local or home base station (HBS) 104. This element handles the radio link protocols with the mobile terminal MT 1 and contains radio transceivers that define a cell in a similar manner to the operation of a conventional GSM base station transceiver BTS 103. The home base station HBS 104 is controlled by a home base station controller HBSC 105, which communicates with a mobile service switching centre MSC 202 over the GSM standard A interface and also with a serving GPRS support node SGSN 203 over a standard Gb interface, if available in the core network portion. The interface between the home base station HBS 104 and its home base station controller HBSC 105 is designated a Y-interface. The home base station controller RBSC 105 provides the connection between the MSC 202 or SGSN 203 and mobile terminal 1. The joint function of the home base station HBS 104 and the home base station controller HBSC 105 emulate the operation of the BSS 101 towards the SGSN 203 and MSC 202. In other words, when viewed from the elements of the core network 20 such as the mobile service switching centre (MSC) 202 and the serving GPRS support node (SGSN) 203, the fixed access network portion 10' constituted by the home base stations HBS 104 and the home base station controller HBSC 105 looks like a conventional access network portion 10.

The applications that run on the mobile terminal MT 1 on top of the public mobile network radio interfaces also run on top of Bluetooth radio between the mobile terminal 1 and the home base station FBS 104.

The interface between the home base station HBS 104 and the home base station controller HBSC 105 which is designated Y in FIG. 1 is preferably provided by a fixed link. The home base station 104 is intended to be a small device that a subscriber can purchase and install in a desired location such as the home or an office environment to obtain a fixed access to the mobile network. In order to reduce the installation costs on the part of the operator, the interface between the home base station 104 and the home base station controller 105, which is designated interface Y in FIG. 1 therefore preferably exploits an already existing connection provided by a fixed network 106. Preferably this network is a broadband packet network. Suitable networks might include those based on ADSL, Ethernet, LMDS, or the like. Home connections to such networks are increasingly available to subscribers. Although not shown in FIG. 1, the home base station HBS 104 will be connected to a network terminal giving access to the fixed network 106, while the home base station controller HBSC 105 may be connected to an edge router ER of the network 106 that also links the fixed network 106 to other networks such as intranets and the internet. IP is used for communication between the home base station HBS 104 and home base station controller HBSC 105 over the fixed network 106 to render the transport of data independent of the network type. The link between the home base station HBS 104 and the home base station controller HBSC 105 is preferably always open, so that this connection is always available without the need for reserving a channel. Communication across this fixed network 106 is performed by tunnelling, in other words the upper protocol layers are transported across the access network 106 in a transparent way, without mapping or interworking, as will be described in more detail below. In parallel with the home base station HBS 104, the user may have other devices connected to the fixed network, such as a PC. While the fixed network 106 is preferably an IP-based network, the invention is not limited to this type of network. Specifically ATM-based networks could also be used. In particular when DSL technologies are used in this network, they could be used directly on top of the ATM layer, since they are based on ATM. Naturally, an ATM based network could also be used to transport IP, serving as a base layer.

The home base station HBS 104 is a device that can be purchased by a subscriber and installed by the subscriber in the desired location by plugging it in to a port of an ADSL or CATV modem to access the fixed network 106. The port is in contact with an intranet that is either bridged or routed on the IP level. Thus standard protocols, such as IP, DHCP, DNS and the like are used.

The home base station HBS 104 connected to the modem utilises these standard protocols and functions to ascertain to which home base station controller HBSC 105 it should connect, and also to establish a connection with this home base station controller HBSC 105.

Each home base station controller HBSC 105 controls several home base stations HBS 104 and to this end holds a data structure representing a logical view of these home base stations HBS 105. Configuration procedures alter this data structure as home base stations HBS 104 are added or removed. This will be described in further detail below. When a home base station HBS 104 is added, the home base station controller HBSC 105 establishes a TCP or SCTP connection with the home base station HBS 104. Before this connection has been established the home base station HBS 104 is unable to transfer messages to the home base station controller HBSC 105 even in response to a broadcast paging message. A home base station HBS 104 is allocated an IP address on the fixed network 106. This IP address may either be configured manually prior to installation or be obtained using a DHCP request. The home base station controller HBSC 105 will naturally also have an IP address on the fixed network 106. This address will also be known by the home base station HBS 104 either by manual configuration or obtained by a DNS query to the fixed network 106, in which case the HBS 104 is configured with the symbolic name of the home base station controller HBSC.

Figure 2:
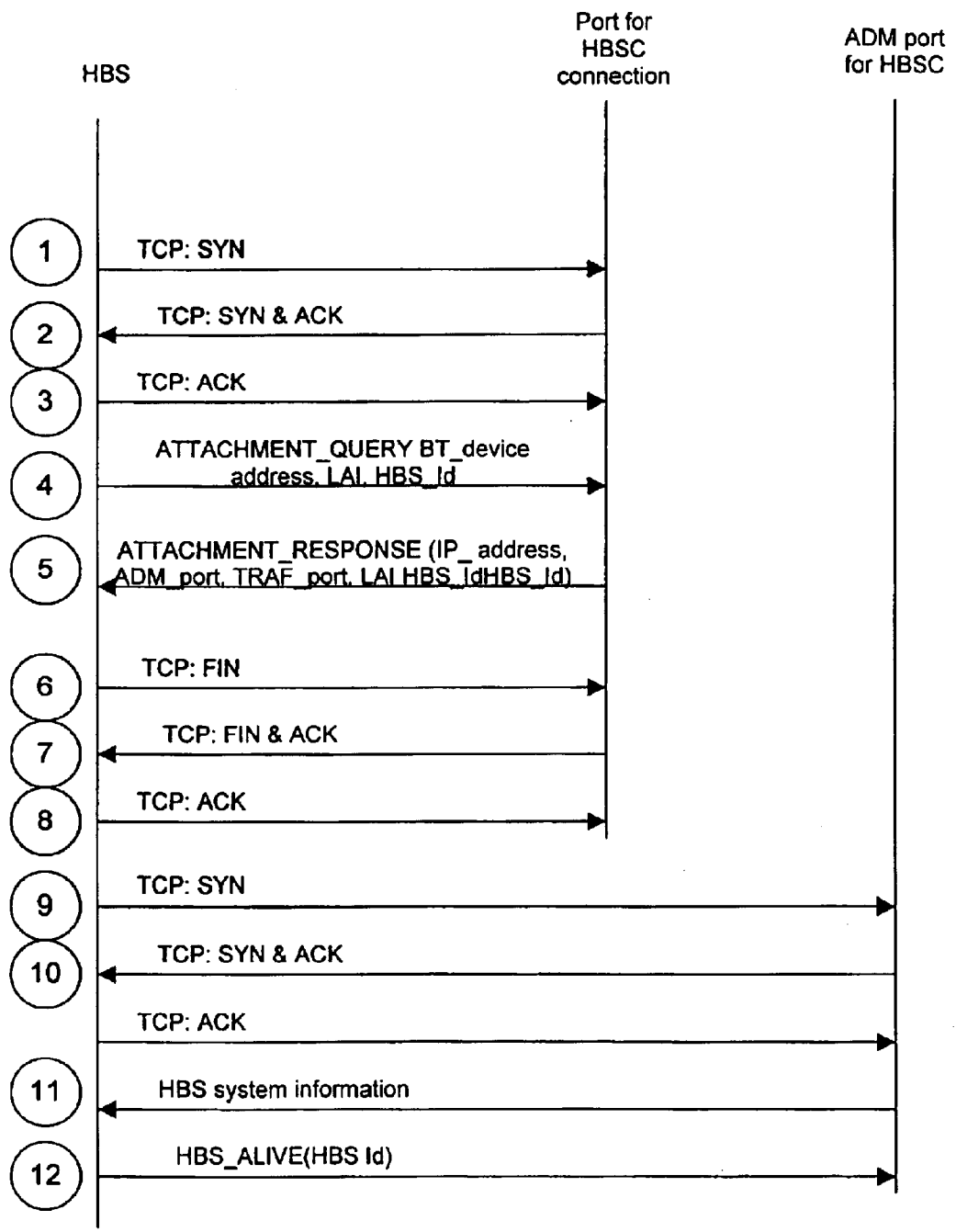
FIG. 2 depicts the signalling sequence for automatic configuration of a fixed access network portion, FIG. 3 schematically depicts an overview of the organisation within a mobile terminal in accordance with the present invention, FIG. 4 schematically depicts the functional organisation of the mobile terminal, FIG. 5 schematically depicts the functional organization of a home base station and home base station controller in accordance with the present invention.

The signalling sequence for this configuration procedure is illustrated in FIG. 2. Specifically, FIG. 2 illustrates the signalling between a home base station HBS 104, an attach-query-port of a home base station controller HBSC 105 and an ADM port of the home base station controller HBSC 105. The procedure starts at power-up or reset, when the home base station HBS 104 attempts to attach to an attach-query-port in the home base station controller HBSC 105. This is achieved first by the home base station HBS 104 sending a TCP synchronisation signal at event 1, which is repeated and acknowledged by the port at event 2. The home base station HBS then sends an ATTACHMENT_QUERY message in event 3. This message contains the Bluetooth device address of the HBS. If the HBS has previously been connected to the HBSC 105, this message will also contain a location area identifier LAI of the HBS 104 and an Id of the HBS 104. These identifiers will be discussed in more detail below with respect to roaming. Security related information is preferably also included in this message to enable the HBSC 105 to authenticate the home base station HBS 104. The home base station 104 is a device that will be acquired by a subscriber and will possibly not be supplied by the operator of the home base station controller 105. It is therefore important to verify that the home base station 104 is authorised to connect to the home base station controller 105 in the same way as a mobile terminal is conventionally authenticated before being allowed to connect to a public mobile communications network. The home base station controller HBSC 105 also has access to a database containing relevant Bluetooth device address information for checking. On reception of the ATTACHMENT_QUERY message, the HBSC 105 stores the IP address of the HBS 104 and the Bluetooth device address, selects an Ethernet interface that should be used by the HBS 104 and two ports that the HBS 104 should use for static and dynamic TCP connections, respectively. The HBSC 105 then opens the assigned ADM and traffic ports for listening. Only the designated home base station HBS 104 will be authorised to connect to these ports, based on its IP address. The assigned ports and other information including the IP address of the selected interface, the location area identifier LAI and a unique identifier HBS Id, is communicated to the HBS in event 5 with an ATTACHMENT_RESPONSE message. On reception of this message, the HBS 104 stores the LAI and HBS Id in non-volatile memory, so that this information will be available after a reset. The TCP connection with the HBSC 105 attach-query-port is then closed by the exchange of messages in events 6 to 8. The home base station HBS 104 then has a limited time, for example 2 minutes, in which to attempt a static TCP connection, otherwise the ports will be closed and allocated resources in the HBSC 105 released. This occurs in events 9 to 11 with TCP synchronisation messages, followed in event 12 by a message from the HBSC 105 communicating system information relevant to the HBS 104. In order to test the static TCP connection, the HBS 104 must send a message to the static port of the HBSC 105, as shown in event 13, in the form of a HBS_ALIVE message. If this message is not received at predetermined intervals the HBSC will close the ports and release the allocated resources. The required time interval is preferably communicated to the home base station HBS 104 by the home base station controller 105 with the ATTACHMENT_ RESPONSE message in event 5. A dynamic TCP connection is set up with the traffic port of the HBSC.

The services provided to the subscriber are independent of whether the mobile terminal MT 1 establishes a link through fixed access network portion 10' or through a standard access network 10, such as represented by a base station sub-system BSS 101 in a GSM network. This is achieved by using the same service environment for all applications. This means, for example that circuit switched voice services are executed in the mobile services switching centre MSC 202. If WAP based services are supported these will be executed in WAP servers as in the conventional network. This also means that the user subscription is located in the home location register HLR 201, even though the user has a subscription to a fixed access network portion 10' in the form of the home base station HBS 104.

A simplified block diagram of the structure of the mobile terminal 1 is shown in FIG. 3. This mobile terminal 1 includes the standard upper layer functions 301 required for any mobile operating in a GSM system. These specifically include the connection management layer and mobility management layer. These layers 301 handle the telephony and, if present, packet data transmission and wireless access protocol (WAP) functions. These upper layer functions 301 connect with the GSM radio function module 302 as in a conventional GSM mobile terminal. The GSM radio module 302 may also support GPRS functions. In addition to this GSM radio module 302, the mobile terminal additionally includes a further radio module 303 for the unlicensed radio service. In the preferred embodiment, the radio service is Bluetooth. This Bluetooth radio function module communicates directly with the upper layer functions 301. The upper layer functions 301 thus transmit the same messages to the mobile core network portion whether using the GSM radio function module 302 or the Bluetooth radio function module 303. This allows the subscriber to perceive no change in the service obtainable whether the mobile terminal is in the coverage area of a home base station (HBS) 104 or a base station subsystem 101.

Figure 4:
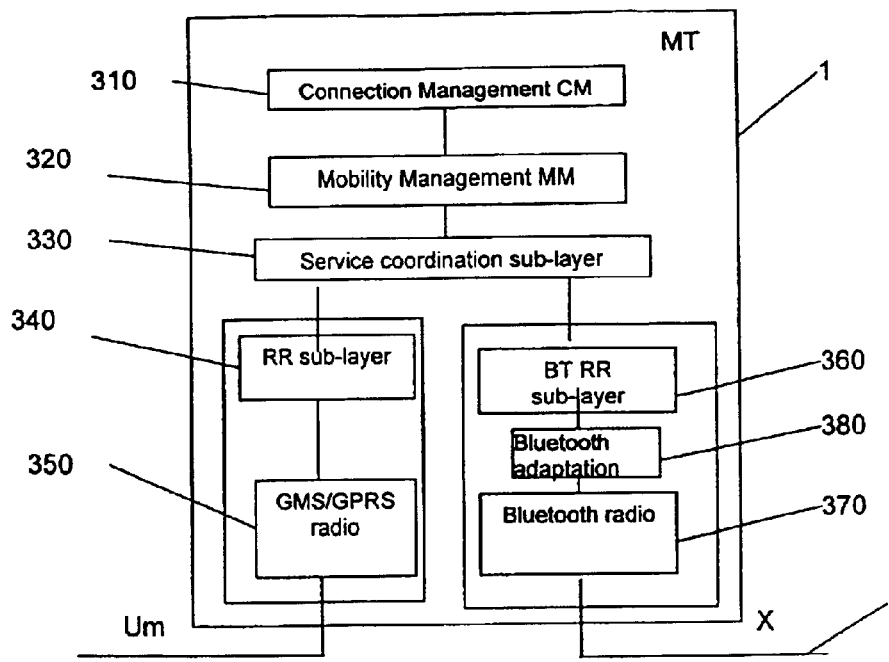

FIG. 4 shows a block representation of the functional organisation of the mobile terminal 1. In common with a conventional GSM terminal, the illustrated mobile terminal 1 includes a connection management layer 310 and a mobility management layer MM 320. In conventional GSM terminals, the mobility management layer MM 320 uses the resources of the radio resource RR layer. In the mobile terminal according to the present invention, a radio resource sub-layer RR 340 dedicated to a GSM radio interface 350 is also included and will be used in the same way as the radio resource layer in a conventional GSM terminal. Incidentally, the GSM radio interface 350 may also serves as a general packet radio interface GPRS. However, functional organisation of the mobile terminal 1 differs from conventional GSM terminals by the inclusion of an unlicensed radio interface, in the exemplary embodiment a Bluetooth radio interface 370 and a radio resource sub-layer 360 dedicated to this Bluetooth radio interface 370. A logical layer 380 for adaptation of the Bluetooth radio interface is provided between the Bluetooth radio interface and the Bluetooth radio resource sub-layer 360. The unlicensed radio interface 370 is run in parallel with the GSM radio interface 350. In order to co-ordinate the two radio resource layers 340, 360, a sub-layer 330 is provided between these and the mobility management MM layer 320. This service co-ordination layer 330 effectively hides the existence of two separate radio resource RR sub-layers from the upper layers. The Bluetooth radio resource layer 360 signals to the service co-ordination layer 330 when it is entering or leaving the coverage of a home base station HBS area. This organisation means that the upper layers 320, 310 of the mobile terminal 1 operate as if only one radio interface is present. This permits the subscriber to pass between links with a conventional base station sub-system 101 or a home base station 104 without noticing a difference in service.

Figure 5:
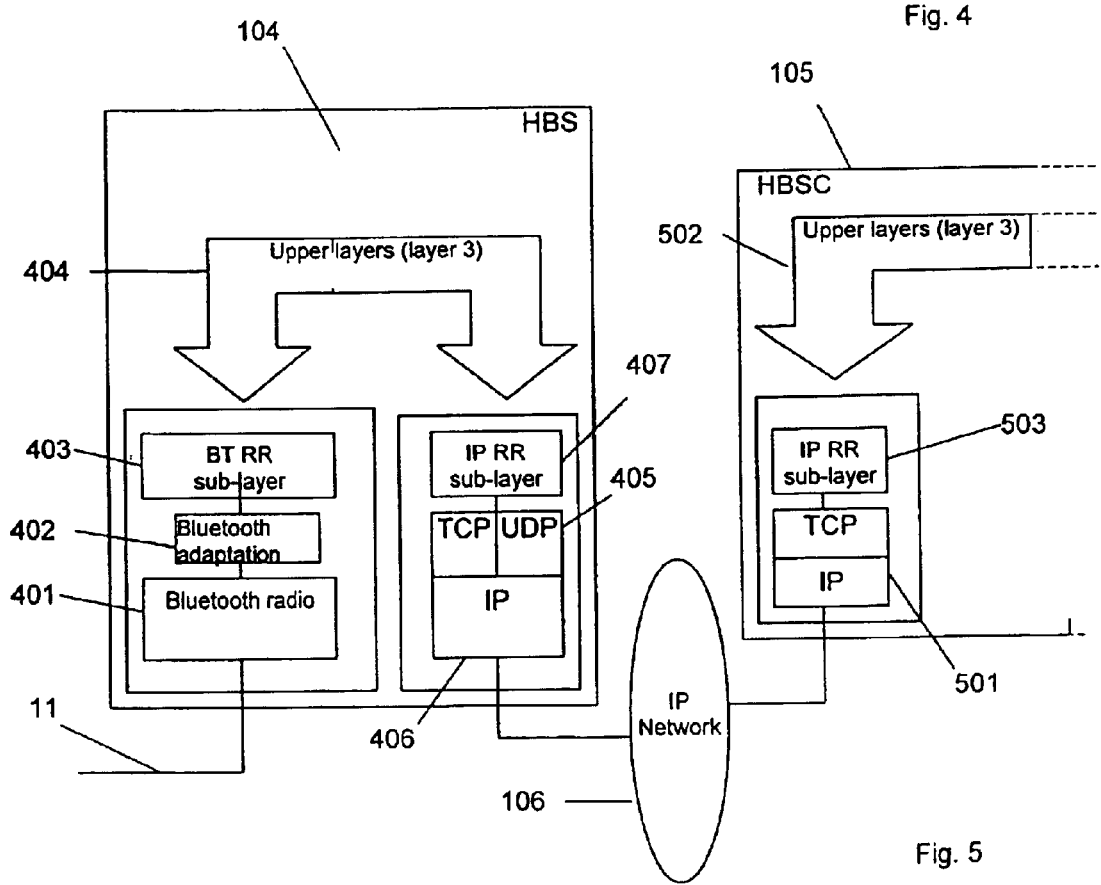

FIG. 5 shows the functional organisation of the fixed access network portion 10' that communicates with a mobile terminal MT 1 over an unlicensed radio link. The X-interface 11 shown in FIG. 4 departing from the Bluetooth radio module 370 connects the mobile terminal MT 1 of FIG. 4 with the a base station HBS 104 shown in FIG. 5. The home base station HBS 104 also has a Bluetooth radio module 401 that connects with a Bluetooth radio resources sub-layer BT-RR 403 through a Bluetooth adaptation layer 402. The Bluetooth radio resources sub-layer 403 provides services to upper level layers 404, which are essentially so-called 'layer 3' services, although the radio resource control protocol layers conventionally included in layer 3 in GSM systems are not part of these layer 3 services. As discussed later, the upper layers that are transported transparently, i.e. without interworking or mapping, through the fixed access network 10' include at least the mobility management protocol layer and above. These upper layer services are indicated in the figure by a double headed arrow 404 between lower layers on the mobile terminal and home base station controller sides of the home base station The lowest layers at the interface between the home base station HBS 104 and the home base station controller HBSC 105 is adapted to run IP. A suitable interface is the 10 Base T or 100 Base T Ethernet interface. This is illustrated in FIG. 5 by a lower IP layer 406 on top of which either TCP or UDP 405 is run. It will be understood that SCTP may be used in place of TCP. Above this layer is provided a radio resource layer RR IP 407 that is specifically adapted to the IP-based interface between the home base station HBS 104 and the home base station controller HBSC 105. The physical interface between these elements is an IP based fixed network 106. At the home base station controller HBSC 105, the lower layers 501 are again the modified IP adapted radio resource control layer RR IP503 over TCP (or SCTP) or UDP over IP. In FIG. 5 only a GSM home base station controller HBSC is shown. As for the home base station HBS 104, the lower layers 501 of the home base station controller HBSC. 105 provide services to the upper layers 502, which again are represented as an arrow directed towards the core network portion side of the home base station controller 105. It is apparent from this organisation that the upper layers, in other words essentially the layer 3 services represented by the mobility management MM 320 and connection management CM 310 layers in the mobile terminal MT 1 are relayed between the mobile terminal MT and the core network portion 20 without mapping or other interworking functions. The transport of these layers is transparent to the lower Bluetooth layers 360, 380, 370 and 401, 402, 403 of the X interface and to the TCP or UDP over IP layers of the Y interface through the fixed network 106. The connection through the fixed network 106 is thus a tunnel.

As mentioned above, the installation of the fixed access network portion 10', is simplified by obviating the need for cell planning on the part of the network operator. A consequence of this is that, unlike a base station controller BSC 102 in a GSM network, the fixed access network 10' will not know the location of a home base station HBS 104 relative to surrounding cells, and so cannot direct a mobile terminal MT 1 to listen out for signals from specific cells in anticipation of handover. This is overcome in accordance with the invention by using a self-planning radio technology and allowing the mobile terminal MT 1 to pass information about neighbouring cells in the public mobile network to the home base station controller HBSC 105 unsolicited by the access network 10'. Preferably, the mobile terminal MT 1 retains identification information of the last public mobile network cell in which it was located. This information is passed to the network in anticipation of a possible handover. The mobile terminal MT 1 may also monitor signal strengths of surrounding cells periodically and pass this information together with the cell identification to the network. Consequently, the knowledge about cells neighbouring to the coverage of a home base station HBS 104 is built up dynamically as this information is passed on by the mobile terminal MT 1. The information is preferably passed from the mobile terminal MT 1 to the network using a location update message which is known from conventional public mobile network procedures such as GSM.

The organisation and mechanisms required for roaming and handover between the coverage area of home base stations HBS 104 and cells of a public mobile network defmed by base transceiver stations 103 is described further below.

Roaming

In conventional public mobile systems, such as GSM, network coverage is divided into multiple location areas LA which may comprise one or several BTS cells. Each location area is assigned a unique code called a location area identifier LAI. A similar system of areas, termed routing areas RA is proposed in the general packet radio service GPRS. The position of a mobile terminal MT 1 can be tracked using the system of location areas LA when no session is ongoing. Specifically, when a mobile terminal MT 1 enters a new LA it reports this to the network. This information is used by the network when the mobile terminal MT 1 is paged. The network pages the whole location area LA and waits for the paged terminal to respond.

In accordance with the present invention, all home base stations HBS 104 configured to connect to a single home base station controller HBSC 105 are assigned to the same location area LA. This is illustrated in FIG. 6. FIG. 6 shows four cells 40 of a conventional GSM mobile network each represented as a hexagon. Each cell 40 is defined by, and surrounds, a base transceiver station BTS 103. In the illustrated example, two cells are grouped into a single location area 41. This is shown as a continuous line around the two cells 40. Within this location area 41 is a second, Bluetooth location area 42 containing a home base station HBS 104. A further home base station HBS 104 and its surrounding coverage area that is also designated the location area 42 is located partly in this location area 41 and partly in a neighbouring cell 40.

When a mobile terminal MT 1 moves into the location area 42 of the home base station HBS 104, the Bluetooth module 303 in the mobile terminal MT 1 and a Bluetooth module in the home base station establish a Bluetooth communication link. On a functional level, the Bluetooth radio resource sub-layer 306 in the mobile terminal 1 determines whether the signal strength is good enough to establish a reliable connection. The Bluetooth radio resource sub-layer 360 then informs the mobility management MM functional plane 320 via the service co-ordination sub-layer 330 about the new location area 42, which triggers the mobility management layer 320 to perform a location update procedure directed towards the home base station HBS 104 in the location area 42. The Bluetooth radio resource sub-layer 360 periodically reads the signal strength and informs the service co-ordination sub-layer 330 about the current level.

When the mobile terminal MT 1 moves out of the home base station 104 coverage area 42 such that the signal level drops to a critical level, the service co-ordination sub-layer 330 activates the GSM radio interface 350 through the radio resource sub-layer 340. When the mobility management MM layer 320 is informed about the new location area 41, which is assigned to the public mobile network, a location update procedure will be performed using normal GSM procedures.

As mentioned above, in conventional public mobile telecommunication networks location areas LA normally cover a number of cells. In the fixed access network portion 10' of the invention, a single home base station controller HBSC 105 will handle one location area. In other words all home base stations HBS 104 connected to a home base station controller HBSC 105 will be assigned to a single location area. Since the network operator has no influence over the true location of a home base station HBS 104 as this may be installed at any suitable location by a subscriber conventional cell planning and organising of home base stations into location areas is not practical.

A consequence of providing only a single location area LA for all mobile terminals is that a paging message transmitted by the core network 20 will naturally be addressed to all mobile terminals. Allowing all terminals to be paged in this way is naturally a waste of network resources. To prevent this, the home base station controller HBSC 105 is provided with a register or database 1051 for storing the location of mobile terminals that have been connected to home base stations 104. This is illustrated schematically in FIG. 7. This register 1051 is similar in structure to a visitor location register VLR. It may be constructed as part of the home base station controller structure, or be a separate entity that can be accessed and consulted by the home base station controller as necessary. The register 1051 is constructed as information is received about the location of a mobile terminal. The coverage of a single home base station HBS 104 will define a cell and each home base station HBS will have a unique cell identity. As mobile terminals 1 roam into a cell of a home base station and performs a location update, the home base station controller HBSC maps the international mobile subscriber identity IMSI of the mobile terminal to a home base station cell identity HBS_id. This register will thus be modified as a new mobile terminal roams into a new home base station HBS cell.

When a mobile is paged, the home base station controller HBSC 105 looks into the paging message to determine which mobile terminal is paged by identifying the IMSI. Using the mapping in the register 1051, the home base station controller determines to which home base station 104 the paging message should be sent and can thus confine the paging message to this home base station 104 only. The cell identification associated with each home base station HBS ensures that this is transparent for existing charging and statistical functions in mobile services switching centres MSC 202 and serving GPRS support nodes SGSN 203.

Preferably it is possible to limit access to the core network 20 through the fixed access network portion 10', so that a subscriber can specify which mobile terminals will be able to recognise a Bluetooth radio connection with a particular home base station HBS. This can be achieved with Bluetooth radio by using the feature within Bluetooth to pair entities. For a home base station HBS 104 required to provide access to multiple mobile terminals 1, such as in a corporate environment, user selection is preferably performed on a network level.

Handover

Since home base stations and their associated cells will generally be located in the coverage area of base transceiver stations BTS 103 of a public mobile network, handover of an established call from a base transceiver station BTS 103 to a home base station will not be necessary. Thus all calls established via GSM or other public mobile network radio will be concluded on public mobile network radio. If the mobile terminal has roamed into a home base station cell during this session and remains in this cell, subsequent calls will be performed using the Bluetooth radio or other unlicensed radio interface.

Handover is thus necessary only when a call established through a home base station HBS 104 using Bluetooth radio must be passed over to a base station transceiver BTS 103 using public mobile network radio when the mobile terminal moves out of the coverage area of the home base station HBS 104. This procedure is illustrated in FIG. 8.

Figure 8:
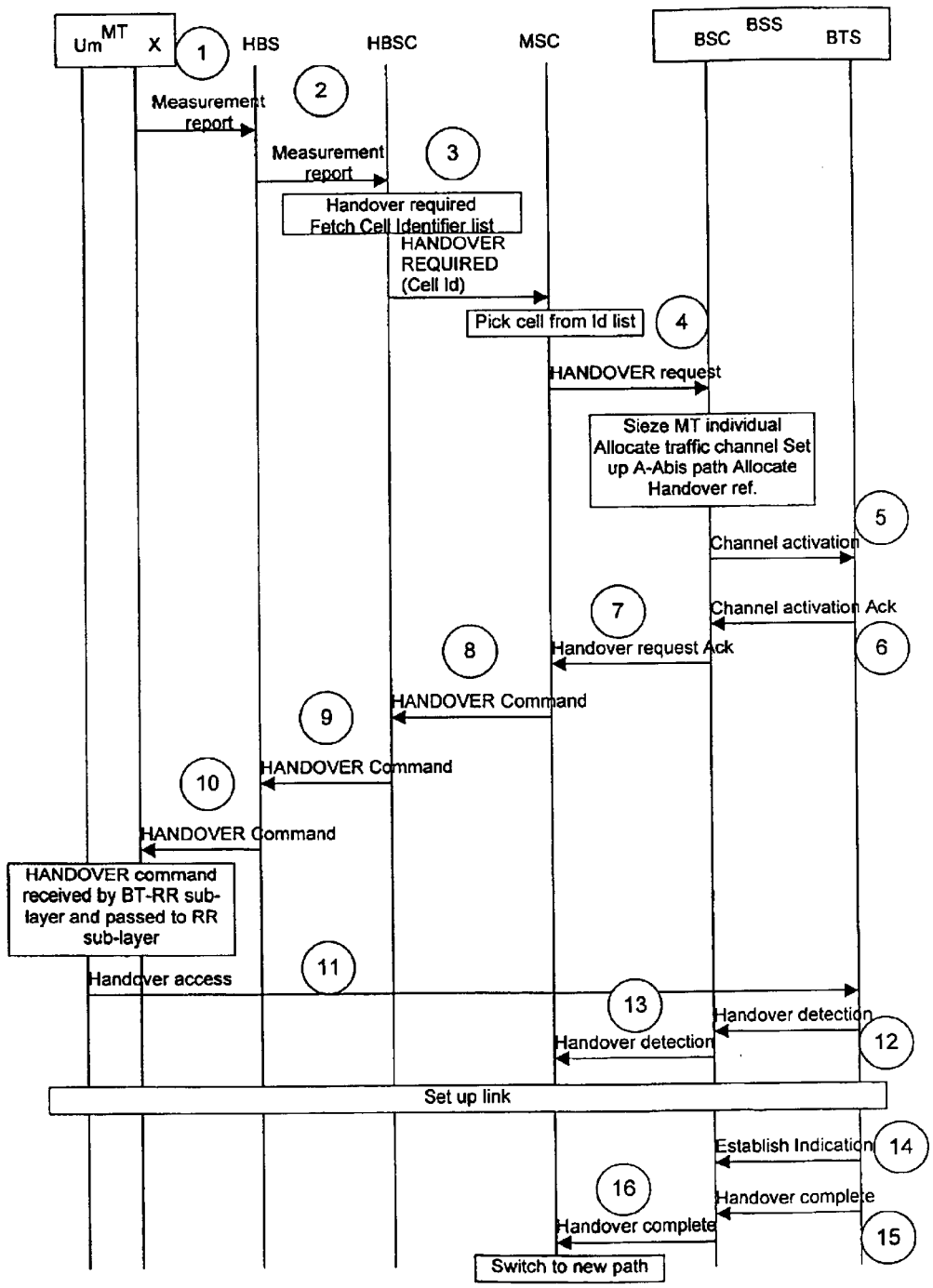
FIG. 8 depicts the signalling sequence for handover.

FIG. 8 shows the sequence of signalling between the mobile terminal MT 1, the home base station HBS 104, the home base station controller HBSC 105, the mobile services switching centre MSC 202 and a base tranceiver station BTS 103 and base station controller of a base station sub-system BSS 101.

Before handover is performed it is assumed that the mobile terminal MT 1 has previously identified the strongest public mobile radio signal from a neighbouring cell 40, or alternatively retains the cell id of the last public mobile radio cell used, and subsequently passed the cell identity to the home base station controller HBSC 105 via the home base station HBS 104 as part of the location update procedure.

As already described in relation to roaming, the Bluetooth radio resource sub-layer 360 periodically monitors the Bluetooth signal strength and reports this to the service co-ordination sub-layer 330. When a call is active, the Bluetooth radio resource sub-layer 360 also sends a message for delivery to the home base station HBS 104 which is conveyed to the home base station controller HBSC 105. This is illustrated at events I and 2 in FIG. 8. The home base station controller HBSC 105 evaluates the reported measurements to determine whether handover is required. If handover is required, a HANDOVER REQUIRED message is generated with the cell identity of the GSM cell previously delivered written into this message. This message is sent to the mobile services switching centre MSC 202 as shown at event 3. The MSC 202 then sends a HANDOVER request to a base station controller BSC 102 of the identified base transceiver station 103 in event 4. The base station controller takes care of allocating a traffic channel in accordance with conventional GSM procedures and receives an acknowledgement of the activation of this channel from the base transceiver station in events 5 and 6. In event 7 the base station controller BSC 102 sends an acknowledgement of the HANDOVER request to the MSC 202, which in turn sends a HANDOVER command to the home base station controller HBSC 105 in event 8 for transmission to the home base station HBS 104 in event 9. The home base station HBS 104 sends a HANDOVER command to the mobile terminal MT 1 in event 10. This is received by the Bluetooth radio resource sub-layer 360 and passed via the service co-ordination sub-layer 330 to the radio resource sub-layer 340 above the GSM radio module 350, which then starts to send handover access bursts over the Um interface to the base transceiver station BTS 103 in event 11. These are detected in the normal way by the base transceiver station BTS 103 which reports detection to the MSC 202 via the base station controller BSC 102 in events 12 and 13. The link is then established between the base station transceiver BTS 103 and the mobile terminal MT 1 and after the base station transceiver BTS 103 has sent an establish indication message to the base station controller BSC 202, the handover is completed and an acknowledgement sent by the base transceiver station BTS 103 to the base station controller BSC 202 and by the base station controller BSC to the MSC 202 in events 15 and 16. The MSC 202 then switches to the new path.

Before handover takes place, the subscriber is preferably alerted that the mobile terminal is moving out of range of the home base station HBS 104, i.e. that the Bluetooth radio signal is reaching a critically low level. This may be done by the service co-ordination sub-layer 330 ordering an audio or other alarm notification while a signal level is at a critical level and terminating this notification when the signal level rises.

Figure 9:
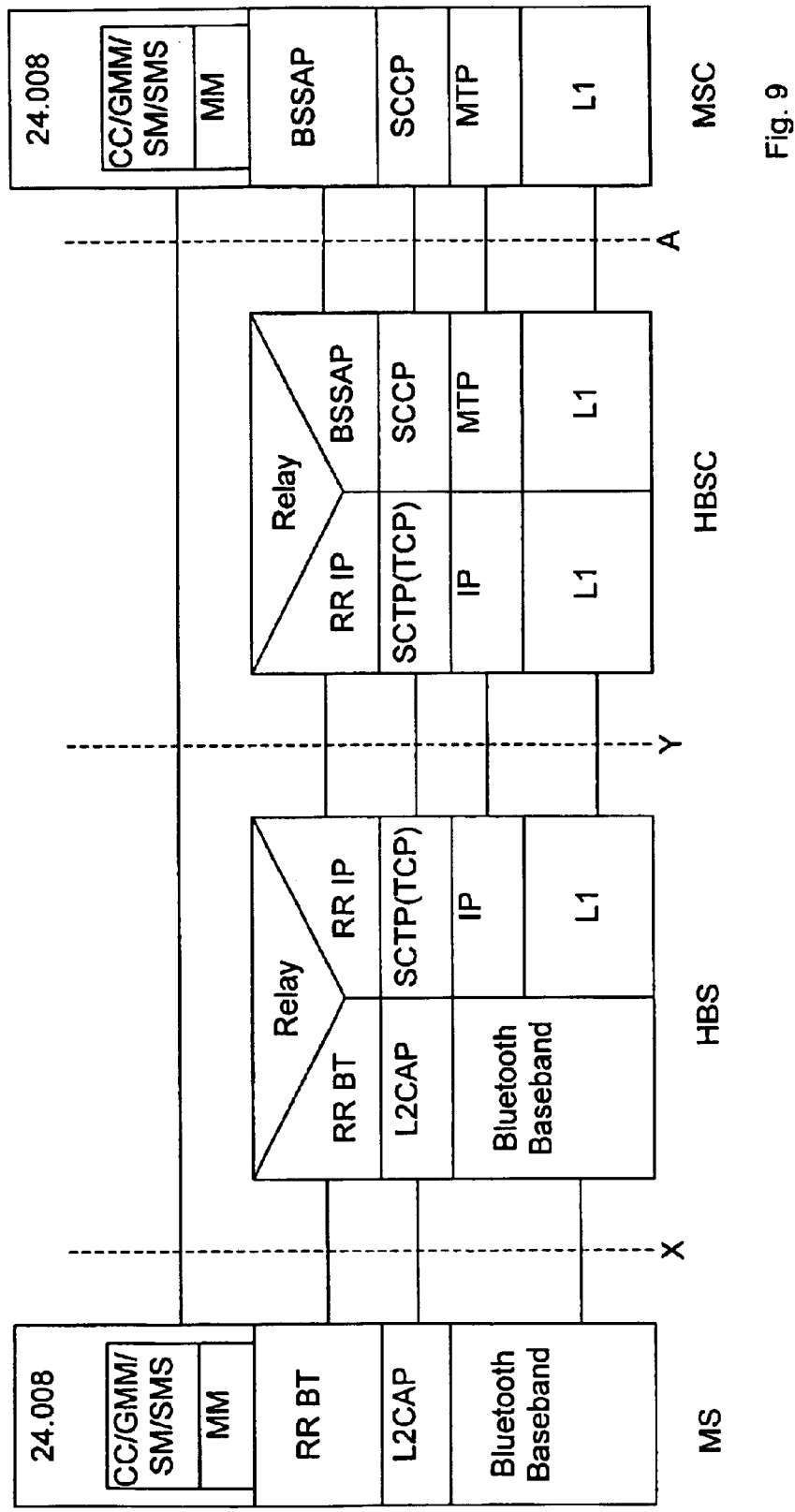
FIG. 9 shows the protocol stacks of the modified access network in the control plane.
Figure 10:
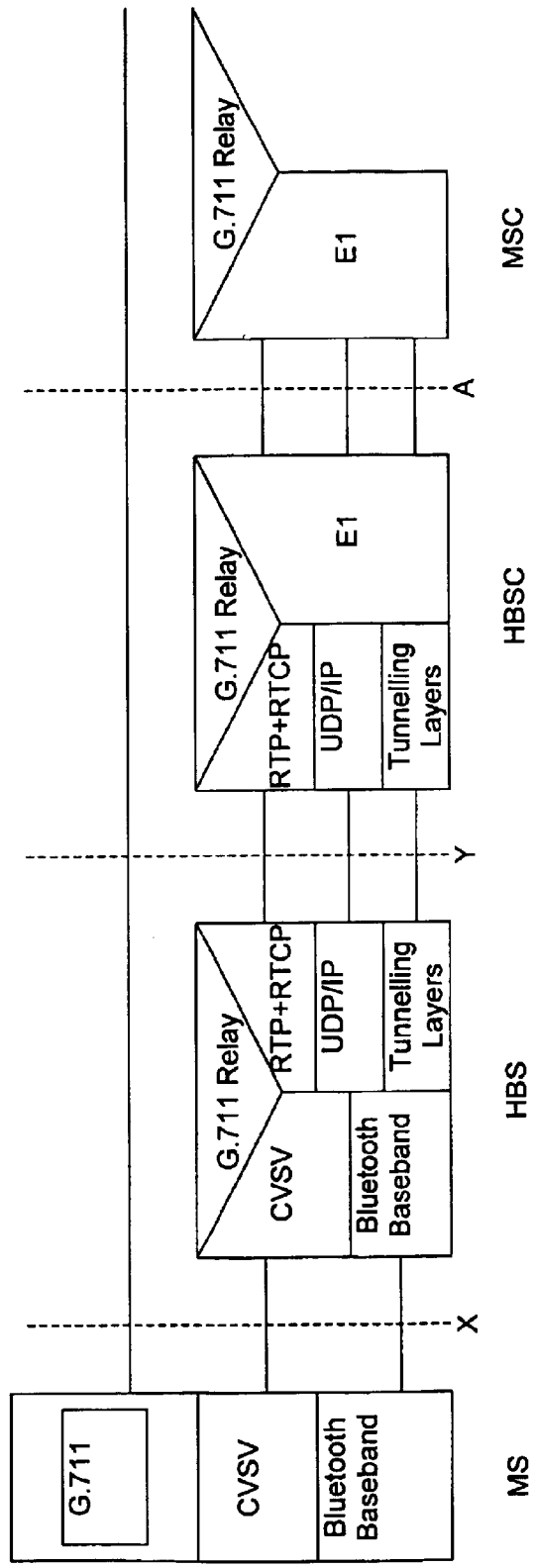
FIG. 10 shows the protocol stacks of the modified access network in the user plane.

FIGS. 9 and 10 show protocol architectures for the various elements in the fixed access network portion 10' of a second generation GSM access network according to the invention.

FIG. 9 illustrates the protocol layers for transport of third generation protocol specified in the 3GPP Technical Specification 24.008 between a mobile terminal MT 1 and a mobile services switching centre MSC 202. In the control plane, the peer higher level layers of the mobile terminal MT 1 and the mobile services switching centre MSC 202 communicate directly with one another. In other words these layers are relayed through lower layers by both the home base station HBS 104 and the home base station controller HBSC 105 in a transparent manner. These levels are the mobility management MM layer and the CC, GMM, SM and short message service layers. The lower layers of the mobile terminal MT 1 communicate directly with peer layers in the home base station HBS 104. These include the Bluetooth radio resource control protocol layer RR BT, which among other tasks deals with the allocation of synchronous Bluetooth channels. Below the Bluetooth radio resource control protocol is the layer 2 competitive access provider L2CAP and the Bluetooth baseband layer. At the Y interface between the home base station HBS 104 and home base station controller HBSC 105 is provided a further radio resource control protocol adapted to IP layer RR IP. Below this radio resource layer is include an IETF synchronous control transport protocol SCTP, which with communicates with a peer SCTP layer in the HBSC 105. It will be apparent that this SCTP layer could be replaced by a TCP protocol layer. This is carried on an IP layer, which likewise communicates with an IP layer in the HBSC 105. Finally lower layer tunnels through the fixed network 106 establish direct links with corresponding layers in the HBSC 105. The upper layer protocol messages are carried through the home base station HBS 104, the home base station controller HBSC 105 and across the Y interface over the respective radio resource control protocol layers. Turning now to the A-interface between the HBSC 105 and MSC 202, the upper layer messages are carried over a base station service access point layer BSSAP. This sits above a signalling connection control part layer SCCP, a message transfer part layer MTP and a layer 1 level, in that order. Each of these layers communicate with peer layers in the MSC 202.

The provision of a radio resource layer BT-RR/RR IP in the mobile terminal 1, home base station and home base station controller that is suitably adapted to carry upper layer messages over Bluetooth and IP based links, respectively enables 24.008 messages to be carried from the mobile terminal through to the mobile services switching centre MSC 202, and therefore over both an unlicensed radio interface and an IP-based fixed network in a transparent manner. Thus all services in 24.008 can be supported for a mobile terminal MT that accesses the mobile core network portion via an unlicensed radio link, such as Bluetooth, in a forward compatible manner.

The modified Bluetooth and Internet Protocol radio resource control protocols RR BT and RR IP differ from the GSM standard protocol. Specifically, these new protocols are dependent on, and adapted to, the unlicensed radio technology used and transport over IP, respectively. They provide a transparent transport mechanism for upper layer information, that is of the mobility management layer and above. They also support the existing service access points (SAP) to the mobility management layer. In addition to these new radio resource protocols a modified mobility management protocol is used for 24.008 transport. Specifically, the mobility management layer enables cell planning, i.e. enabling the network entity that controls a number of cells to obtain the identity and other data of neighbouring cells that it does not control. The layer 2 protocol in the mobile terminal MT must also support the interaction between the radio resource layer for GSM radio and the radio resource layer for Bluetooth radio.

FIG. 10 depicts the user control plane for voice transport between a mobile terminal MT 1 and a mobile services switching centre MSC 202. At the top of the layers in the mobile terminal MT 1 G.711 voice protocol communicates directly with a peer layer at a called or calling subscriber. These protocol messages are relayed through the home base station HBS 104, home base station controller HBSC 105 and the mobile services switching centre MSC 202. The next layer down in the mobile terminal MT 1 defines the modulation scheme which is continuously variable slope delta modulation CVSD. This layer sits above a Bluetooth baseband layer, which is the lowest layer in the MT. This lowest layer communicates with a peer layer in the HBS, which likewise lies below a modulation layer CVSD. On the Y-interface between the HBS 104 and HBSC 105 an RTP layer sits at the top of the stack above a UDP over IP layer, which communicates directly with a peer layer in the HBSC 105. Below the UDP over IP layer are tunnelling layers for establishing direct tunnelling links across the fixed network 106 as in the control plane described with reference to FIG. 9. The A interface between the HBSC 105 and MSC 202 uses the standard E1 protocol.

While the present invention has been discussed with reference to a GSM network, it will be understood that it may be applied to other mobile networks, specifically the third generation mobile network UMTS both with or without GPRS. The invention as described above may be used in any mobile network that allows the separation of an access network portion from a service network portion.

Moreover, those skilled in the art will recognise that while a mobile terminal capable of supporting both public mobile network radio communication, such as GSM, and unlicensed radio communication, is convenient for the subscriber, this is not necessary. The subscriber may instead use a separate unlicensed radio handset for accessing the public mobile network via the fixed access network portion 10' provided by a home base station and home base station controller. Such a handset would include all the layer functions in the described combination mobile terminal 1, but exclude those layers relating specifically to the licensed radio. A conventional mobile terminal for use in the public mobile network would then have to be used outside of the coverage of a home base station and handover between the two access networks would not be supported as described above.

What is claimed is:

1. A mobile telecommunications network including an access network portion and a core network portion, wherein said access network portion includes an access control part arranged to communicate with said core network portion over a predetermined licensed mobile network interface, wherein said access network portion further includes at least one base station part arranged to communicate with mobile terminals over an unlicensed radio interface and
 a fixed broadband network; connecting said access control part and said at least one base station part,
 wherein said access network portion is arranged to relay upper layer messages between a mobile terminal and said core network portion in a transparent manner over said unlicensed radio interface, wherein said upper layer messages include mobility management messages and above.

2. A network as claimed in claim 1, wherein said unlicensed radio interface uses broadband radio.

3. A network as claimed in claim 1, wherein said unlicensed radio interface is a Bluetooth interface.

4. A mobile telecommunications network including an access network portion and a core network portion, wherein said access portion includes a plurality of base station systems for communicating with mobile terminals over a licensed public mobile network air interface, said base station systems being arranged to communicate with said core network portion over a predetermined mobile network interface, wherein said network includes at least one local base station system arranged to communicate with said core network portion over said predetermined mobile network interface and further adapted to communicate with mobile terminals over an unlicensed radio interface, wherein said local base station system is arranged to relay upper layer messages between said mobile terminals and said core network substantially transparently, wherein said local base station system includes at least one local base station for communicating with mobile terminals over said unlicensed radio interface and a local base station controller connected to said at least one local base station and adapted to communicate with said core network portion over said predetermined network interface, wherein said local base station is connected to said local base station controller through a fixed broadband network, wherein said fixed network is an IP-based network, and upper layer messages exchanged between said mobile terminals and said core network portion are relayed between said local base station and said local base station controller by tunnelling through said IP-based network.

5. A network as claimed in claim 4, wherein said fixed network is an ATM-based network.

6. A network as claimed in claim 4, wherein said unlicensed radio interlace uses broadband radio.

7. A network as claimed in claim 4, wherein said unlicensed radio interlace is a Bluetooth interface.

8. A method of registering a base station that is adapted to communicate with mobile terminals through an unlicensed radio link with an access network controller that provides access to a core network of a public mobile telecommunications network through a fixed network interposed between said base station and said access network controller, said method including the steps of:

receiving a connection request including an unlicensed radio device identifier from said base station through said fixed network, authenticating said unlicensed radio device identifier, selecting a base station identifier and reserving at least one communication port on said fixed network for communication with said base station, transmitting a response to said connection request including an interface address for said reserved port and said base station identifier, checking for said base station identifier in communication requests through said interface address and reserved port prior to permitting communication.

9. A method as claimed in claim 8, further including the steps of:

communicating a connection maintenance time interval to said base station, and releasing said reserved port if a connection is not established within said time interval.

* * * * *